US012592169B2

(12) United States Patent
Trask

(10) Patent No.: US 12,592,169 B2
(45) Date of Patent: Mar. 31, 2026

(54) INTERACTIVE DIGITAL SIGNAGE SYSTEM

(71) Applicant: Keone Trask, Greenville, SC (US)

(72) Inventor: Keone Trask, Greenville, SC (US)

( * ) Notice: Subject to any disclaimer, the term of this patent is extended or adjusted under 35 U.S.C. 154(b) by 0 days.

(21) Appl. No.: 18/958,712

(22) Filed: Nov. 25, 2024

(65) Prior Publication Data

US 2025/0182653 A1 Jun. 5, 2025

Related U.S. Application Data

(60) Provisional application No. 63/604,476, filed on Nov. 30, 2023.

(51) Int. Cl.
| | |
|---|---|
| *G09F 9/35* | (2006.01) |
| *F16M 11/08* | (2006.01) |
| *F16M 11/28* | (2006.01) |
| *G06F 3/044* | (2006.01) |
| *G09F 27/00* | (2006.01) |
| *H01M 4/58* | (2010.01) |
| *H01M 10/0525* | (2010.01) |
| *H01M 50/247* | (2021.01) |

(52) U.S. Cl.
CPC .............. *G09F 9/35* (2013.01); *F16M 11/08* (2013.01); *F16M 11/28* (2013.01); *G06F 3/044* (2013.01); *G09F 27/00* (2013.01);

*H01M 4/5825* (2013.01); *H01M 10/0525* (2013.01); *H01M 50/247* (2021.01); *H01M 2220/30* (2013.01)

(58) Field of Classification Search
CPC ...... G06F 3/044; F16M 11/08; F16M 11/125; F16M 11/28; F16M 11/42; F16M 11/18; H01M 10/0525; H01M 4/5825; H01M 50/247; H01M 2220/30; G09F 27/00; G09F 9/35
See application file for complete search history.

(56) References Cited

U.S. PATENT DOCUMENTS

| | | | | |
|---|---|---|---|---|
| 2007/0252919 A1* | 11/2007 | McGreevy | ............. | F16M 11/28 |
| | | | | 348/825 |
| 2016/0078791 A1* | 3/2016 | Helms | ................... | G09F 27/005 |
| | | | | 348/789 |
| 2023/0246470 A1* | 8/2023 | Lim | ................... | H02J 7/00306 |
| | | | | 320/162 |

* cited by examiner

*Primary Examiner* — Yaron Cohen

(57) ABSTRACT

Provided is an interactive digital signage system comprising a pedestal comprising a base and a mast and an interactive touchscreen digital display rotationally attached to the mast. A controller for said interactive touchscreen digital display is provided wherein the controller comprises a series 6000A+ computer. At least one battery provides power to the interactive digital signage system. Input/output ports interface the controller to external devices.

56 Claims, 4 Drawing Sheets

INTERACTIVE DIGITAL SIGNAGE SYSTEM

CROSS-REFERENCE TO RELATED APPLICATIONS

This application claims priority to pending U.S. Provisional Application No. 63/604,476 filed Nov. 30, 2023 which is incorporated herein by reference.

BACKGROUND OF THE INVENTION

The present invention generally relates to digital signs and more particularly to a novel system and method for providing interactive digital signage.

Educational institutions have transitioned over the past two generations away from chalk board use, first to marker boards and now to touchscreen displays. These touchscreens comprise a digital display with internal touch sensors and an on-board computer for operation.

Computers are integrated into displays in many ways, with a popular means being the Intel OPS standard computer. OPS computers are essentially specialized computers with an external architecture designed to allow the computer itself to plug into a specifically-sized receiver slot on devices such as touchscreen displays. Many would suggest that the Intel OPS spec is now the industry-wide digital signage standard.

The same is true of advertising. Prior art billboards were generally printed and glued in place on billboards or painted onto fixed signs. With the advent of smart touchscreen panels, advertising is proceeding into the modern age.

Since the introduction of digital signage in 1992, the market has seen rapid growth. Incorporating digital signage into a business typically requires an LCD or LED display and a media player as a basic setup. As the requirement for digital signage has emerged into different markets for a wide range of applications, a requirement for a standardization of hardware was required to simplify new and expanding digital signage infrastructure.

Current digital signage systems offer a digital touchscreen on a stationary stand and, in some cases, audio output on the touchscreen; but no available systems offer a complete, portable digital signage system. More specifically, no products offer a battery-powered system that is height adjustable, rotatable, interactive, with speakers in the stand for better audio function, while also providing a video camera, wi-fi, and cellular and mobile data service as found in a modern cellphone. Such systems are needed in many locations, such as nursing homes, hospitals, customer kiosks, and the like.

Provided herein is a complete digital signage system comprising battery power, height adjustment, rotation, and interactivity, with speakers in the stand for better audio function, while also providing a video camera, wi-fi, and cellular and mobile data service as found in a modern cellphone.

SUMMARY OF THE INVENTION

The present invention is related to Interactive Digital Signage and more specifically, a system which provides a complete digital signage system comprising battery power, height adjustment, rotation, and interactivity, with battery indicator and speakers in the stand for better audio function, while also providing a video camera, wi-fi, and cellular and mobile data service for connectivity.

Particular features of the invention includes an interactive digital touchscreen display mounted on a pedestal comprising a mast wherein the mast length is adjustable preferably by telescoping.

Another particular feature is provided by speakers which are integral to the interactive digital signage for improved audio.

A particular advantage is provided by the ability to operate on conventional AC power or by battery power with batteries preferably located in the base for improved stability.

Another feature is the connectivity with all standard communication linkages, such as USB-A, USB-C, HDMI, audio video mini jacks, and the like and modern cellphone connectivity such as blue tooth.

Another particular feature is provided by an integral video camera and microphone for two-way video communication.

The inventive interactive digital signage offers multiple communication pathways with wi-fi and cellular voice and data so that it can be used for live interactive communication with users.

A particular feature is the ability to operate as a live intake portal for customers while also operating as an interactive communications portal for patients in hospitals and nursing homes.

A particular feature is the ability to utilize the Clear Digital® Signage software suit thereby functioning as a kiosk to provide a wide range of interactivity options that may be set for auto updates.

A particular advantage is provided by the utilization of the chipset, software, and EDLA Android 13 ecosystem of 6000A+ panels thereby allowing for software updates, OS updates, and feature set upgrades all within a single device.

Another particular advantage is the realized in the interoperability with Google and other applications as a Google certified device.

A particular advantage is provided by being fully EDLA-certified in both the chips and firmware thereby providing a google-certified system that is far more secure while providing access to the google play store, more application compatibility, and management by a Google administration system.

A particular feature is the compatibility with an eldercare environment wherein the interactive digital display can function as a large cellular phone, where the icons are much larger and more accessible thereby allowing mobility impaired patients to communicate with staff and family.

Another advantage is in provided in customer intake applications and customer interaction and care wherein the interactive digital signage can be utilized as a customer kiosk to provide live connections with customers by remote staff.

A particular advantage is provided in an interactive digital signage system comprising a pedestal comprising a base, a mast and an interactive touchscreen digital display rotationally attached to the mast. A controller for the interactive touchscreen digital display is provided wherein the controller comprises a series 6000A+ computer. At least one battery provides power to the interactive digital signage system. Input/output ports interface the controller to external devices.

Yet another embodiment is provided in an interactive digital signage system comprising a pedestal comprising a base, mast and an interactive touchscreen digital display rotationally attached to the mast. The interactive touchscreen digital display comprises a capacitive touchscreen with at least 5 up to 20 points of touch and a controller comprising an Android operating system. At least one battery provides power to the interactive digital signage system and input/output ports interface the controller to external devices.

DESCRIPTION OF THE DRAWINGS

The invention will be more readily understood with reference to the following specification in conjunction with the drawings herein.

DESCRIPTION OF THE PREFERRED EMBODIMENTS

The present invention is related to interactive digital signage and, more specifically, interactive digital signage comprising an interactive touchscreen digital display on a pedestal wherein all controls and connectivity are integral to the interactive digital signage.

The invention will be described with reference to the figures which are an integral part of the instant disclosure provided for clarification of the description of the invention without limit thereto. As appropriate, similar elements will be numbered accordingly.

Figure 1:
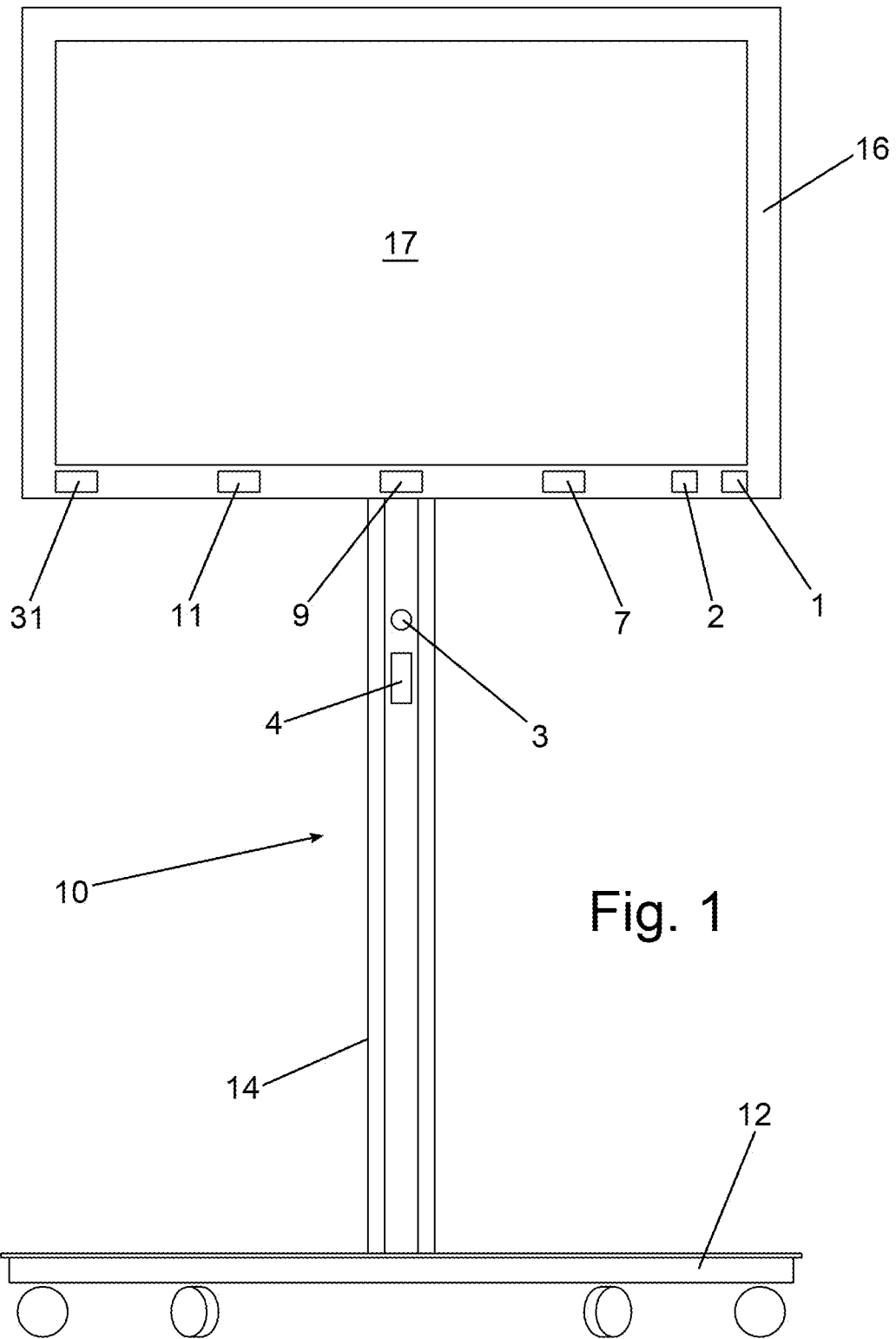
FIG. 1 is a schematic front view representation of an embodiment of the invention.

An embodiment of the invention is illustrated in front schematic view in FIG. 1. In FIG. 1 an embodiment of interactive digital signage, 10, is illustrated to comprise a pedestal wherein the pedestal comprises a base, 12, comprising optional but preferably wheels, such as caster wheels, on the bottom side and a mast, 14, which has an adjustable length extending upward therefrom. The mast is preferably a telescoping mast. An interactive touchscreen digital display, 16, comprising a screen, 17, is mounted to the mast, opposite the base, wherein the interactive touchscreen device can rotate and pivot as will be described further herein. Various controls or indicators are provided on either the pedestal, particularly on the mast of the pedestal, or the interactive touchscreen digital display for such features as displaying a menu, 1, adjusting brightness, 2, turn power on and off, 3, or displaying battery life, 4, which are illustrated for completeness without limit to the number, function or location. A camera, 9, preferably integral to the interactive touchscreen digital display allows for image capture. At least one transponder, 11, integral to the interactive digital signage, and more preferably the interactive touchscreen digital display, allows for connectivity with communication links such as WiFi, a cellular signal or mobile data. A connectivity module, 7, provides wired connectivity with a variety of external devices for transmission of audio, video or other activity to or from the interactive digital signage. A controller, battery, AC power input and various I/O ports are integral to the interactive digital signage as will be further discussed herein. At least one light, 31, is provided wherein the light is to provide illumination to the environment of use or the light may provide an pleasing effect for the viewer. In an embodiment the light comprises multiple, or continuous, illumination elements which circle the image on the screen with light emitting diodes (LEDs), and particularly color LED's being preferred due, in part, to their low weight, low energy usage and ready availability in a variety of form factors.

Figure 2:
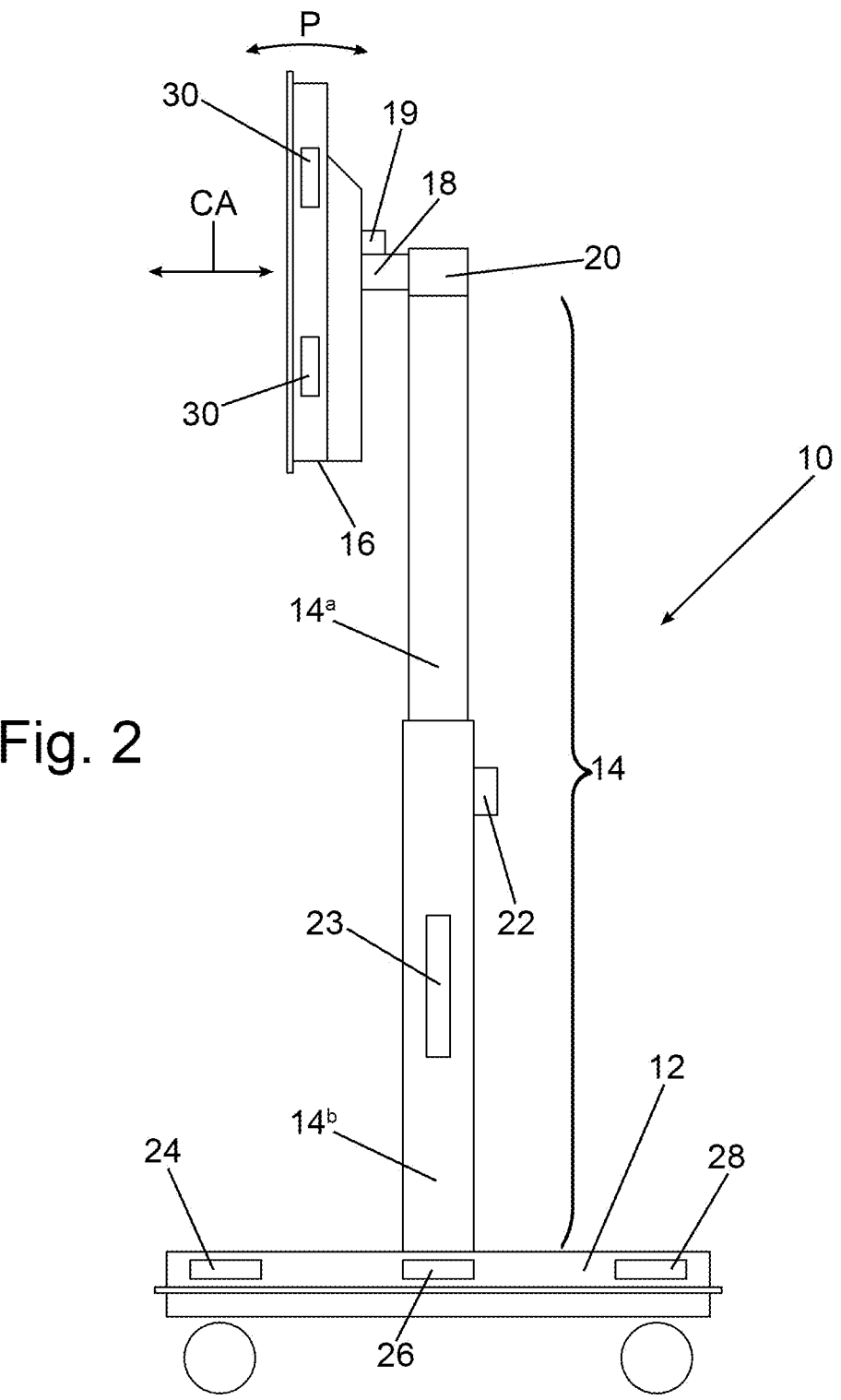
FIG. 2 is a schematic side view representation of an embodiment of the invention.

An embodiment is illustrated in partial cutaway side schematic view in FIG. 2. In FIG. 2, the interactive touchscreen digital display, 16, comprising the screen is attached to the mast, 14, by a collar, 18, and a pivot, 20. An optional, but preferred, rotation indexer, 19, allows the rotation to be temporary limited by friction or in indexed positions such as portrait or landscape. The collar allows the interactive touchscreen display to rotate on the collar axis illustrated for the purposes of clarity as CA. The pivot allows the interactive touchscreen display to tilt relative to the base as illustrated by arc, P. The mast, 14, preferably comprises at least one upper mast, 14*a*, and at least one lower mast, 14*b*, wherein the upper mast and lower mast are slidably engaged or telescopic with the upper mast and lower mast sliding relative to each other. As would be realized additional telescoping mast portions can be utilized. A locking mechanism, 22, reversibly secures the relative position of the mast thereby securing the interactive touchscreen display at a preferred height. When the locking mechanism is engaged, the length of the mast is fixed and when the locking mechanism is disengaged the length of the mast may be increased or decreased thereby allowing the height of the interactive touchscreen display to be altered. As would be realized, the combination of the rotation, tilt and height adjustment provides a great deal of flexibility for viewing angle and visual aspect ratio.

With further reference to FIG. 2, the interactive digital signage comprises a controller, 24, which will be further described herein below, a battery bank, 26, comprising at least one battery, and preferably at least two batteries, and a charging port, 28, which is preferably an AC plug for charging the battery or for operating the interactive digital signage on electrical power. While illustrated in the base; the controller, battery bank or batteries and charging port, can be independently located in the mast or interactive touchscreen digital display. In a preferred embodiment at least the battery bank or batteries is in the base due to weight considerations and the enhanced stability provided by the battery weight being low within the interactive digital signage. In another embodiment at least one of the controller and charging port are located in the base with the battery. At least one speaker, 30, and preferably multiple, preferably digital 8 ohm 5 watt speakers, are integral to the interactive digital signage and most preferably integral to the interactive touchscreen digital display. The speakers can face forward, and project perpendicular to the front of the interactive touchscreen digital display, or they can be mounted on a surface other than the front for convenience of design and functionality without limit thereto. An optional but preferred pneumatic lift, 23, in or integral to the mast assist in the lifting and lowering of the interactive digital display. The technology utilized for integrating a pneumatic lift in a telescoping assembly is not particularly limiting herein.

The screen is preferably an LCD flat panel with wide view angles is particularly preferred. While not limited thereto a 686 mm (27") screen with an aspect ratio of about 16:9 and viewing angle of about 178° in each direction is optimal for demonstration of the invention. A capacitive touchscreen with at least 5 up to 20 points of touch with about 10 points of touch being optimal for demonstration of the invention. Due to the potential for a harsh environment a protective glass over the screen is particularly preferred. The protective glass is not particularly limited with the understanding that the protective glass does not interfere with the touchscreen functionality.

The batteries are preferably lithium ion batteries with 19.2 V, 7.92 amp lithium iron phosphate batteries being particularly suitable for demonstration of the invention.

Figure 3:
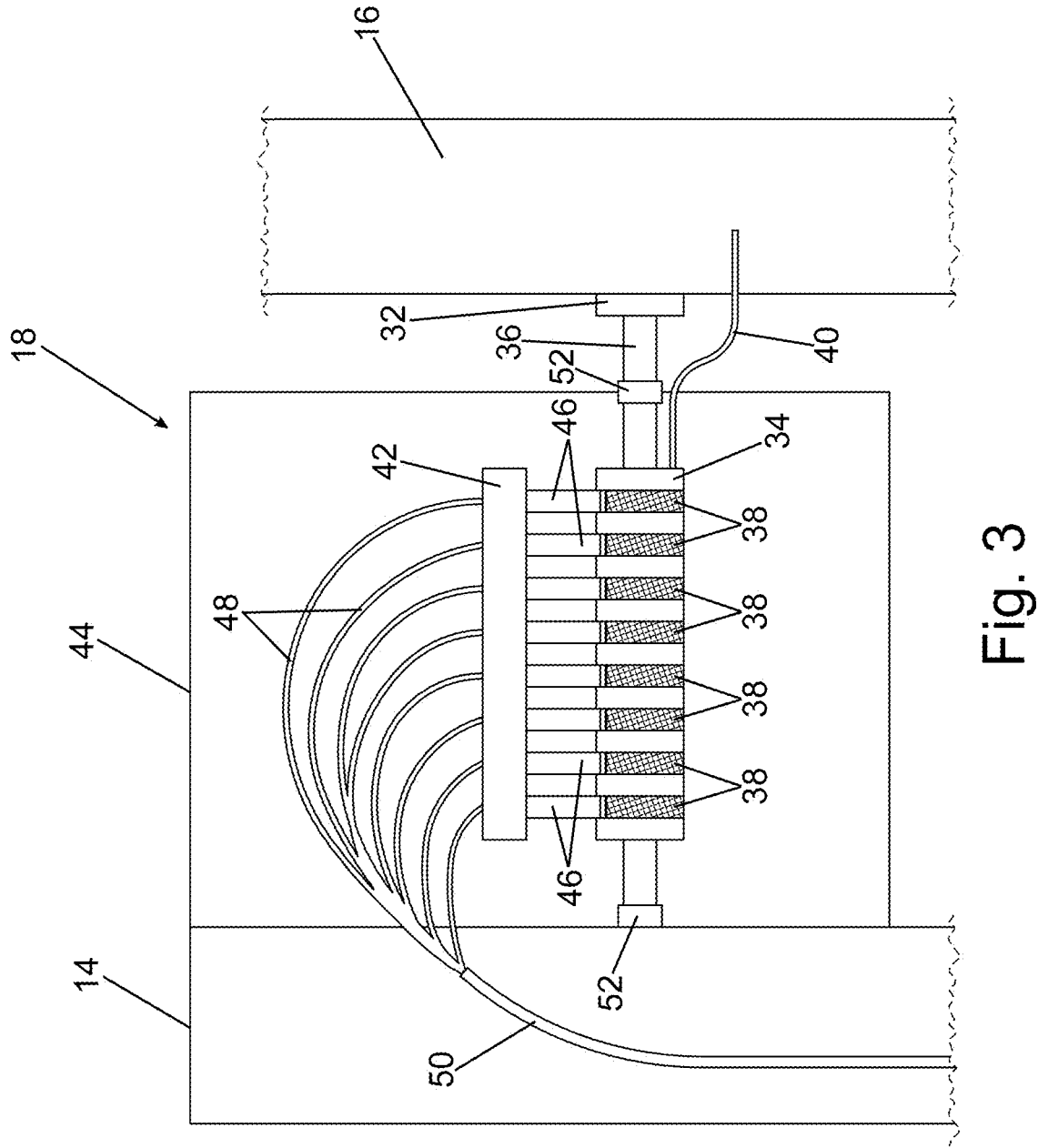
FIG. 3 is partial cutaway schematic side view representation of an embodiment of the invention.

An embodiment of the invention will be described with reference to FIG. 3. In FIG. 3 a collar, 18, is illustrated in partial cut-way schematic view. The collar allows the interactive touchscreen digital display, 16, to rotate relative to the mast, 14, without the risk of damage to the wire connections passing through the collar. With the inventive collar the interactive touchscreen digital display can rotate about the axis of the collar without encumbrance or limit. The collar is mounted to the interactive touchscreen digital display by a rotationally fixed display mount, 32, which is rotationally fixed to a cylinder, 34, such as by a display shaft, 36. As would be realized the cylinder rotates in concert with the interactive touchscreen digital display, 16. The cylinder comprises a multiplicity of traces, 38, which circumnavigate the cylinder. Each trace has electrically connected thereto a wire, preferably in a display bundle, 40, which functionally connects to the circuitry of the interactive touchscreen digital display. As would be realized the number of traces, and functional circuits connected thereto, is at least as many as the number of individual circuits desired. By way of non-limiting example, if the connectivity to the interactive touchscreen digital display is a universal serial bus (USB) connection the number of traces, and functional circuits connected thereto is at least one per connection point on a USB plug. A brush rail, 42, is attached to a casing, 44, in a manner wherein the brush rail is stationary relative to the casing. The brush rail comprises brushes, 46, wherein each brush is in physical contact with a trace wherein the physical contact is sufficient to form an electrical contact. Each brush has a wire, 48, in electrical contact therewith wherein the wires preferably form a mast bundle, 50, which extends preferably through the mast, 14, ultimately connecting to the controller, which is preferably in the base, which is not visible in this view. The casing, 44, is rotationally fixed to the mast, 14. Bearings, 52, between the cylinder assembly, or display shaft thereof, and casing allow rotation of the interactive touchscreen digital display and cylinder relative to the casing and mast since the casing and mast do not rotate in concert with the interactive touchscreen digital display. As the display rotates, relative to the mast, the cylinder rotates yet the traces remain in electrical contact with the brushes thereby forming continuous electrical connectivity between the controller and interactive touchscreen digital display.

The traces are an electrically conducting metal which is not particularly limited herein. Any material typically utilized for the formation of electrical traces can be used to demonstrate the invention. The cylinder is preferably electrically insulating to avoid electrical interference between adjacent traces. The brushes are conductive and flexible and mounted with a bias towards contact to insure that any physical perturbation does not cause the brushes to lose electrical conductivity with the trace. Graphite or wire brushes are particularly suitable for demonstration of the invention.

In a preferred embodiment of the invention the controller operates with the latest 6000A+ series interactive flat panel (IFP) and particularly the NEXT Hub both of which utilize a Rock Chip 3588 as an on-board chip. The on-board chip in concert with a USB receiver allows for voice overlay and integration along with voice augmentation and enhancement. A particularly suitable controller for demonstration of the invention is utilizes Android 11 as an operating system with a 6 core RK3399 Cortex-A72*2+Cortex-A53*4) CPU. A T860MP4 graphics processing unit is suitable for demonstration of the invention. It is preferable that the controller has at least 4G RAM and 64G ROM. WIFI 6 and Bluetooth 5.0 are suitable for demonstration of the invention.

Figure 4:
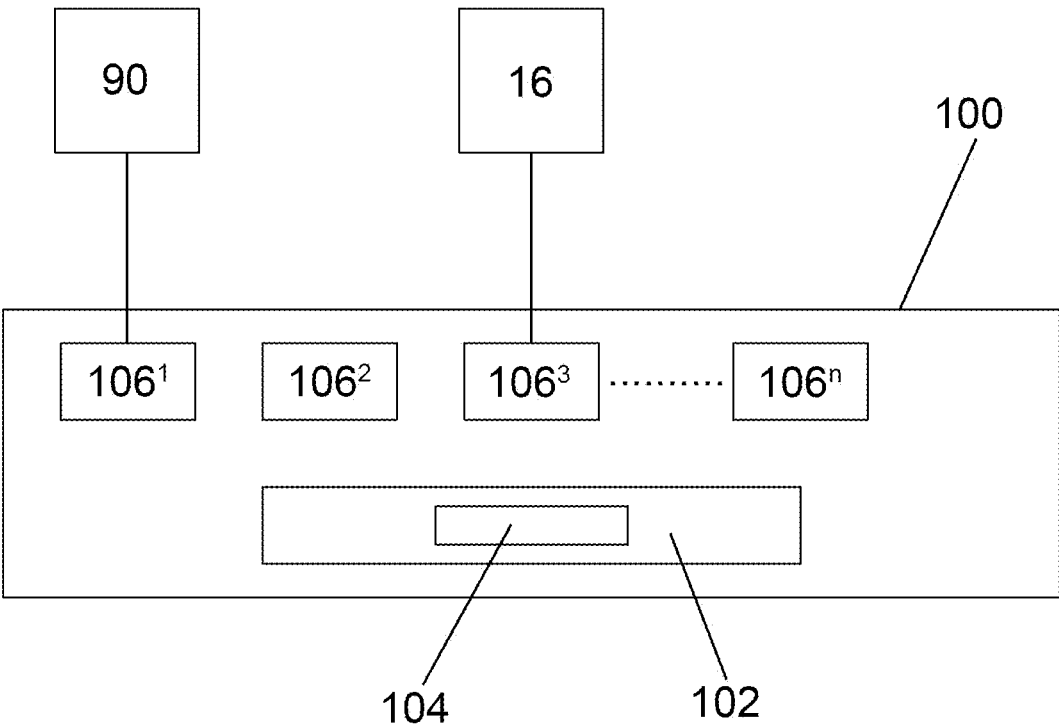
FIG. 4 is a flow chart representation of an embodiment of the invention.

In an embodiment of the invention the controller comprises a NEXT Hub which is preferably integral to the interactive digital signage. The NEXT Hub is illustrated in schematic view in FIG. 4. In FIG. 4, the NEXT Hub, 100, comprises an integral computer, 102, with an operating system, 104, in functional control of the integral computer. Input/Output (I/O) jacks, 106, are in signal communication with the integral computer wherein each I/O jack is capable of signal communication with at least one external device, 90, which may be an audio device, video or computer. At least one I/O jack is in signal communication with the interactive touchscreen digital display, 16.

Wireless links are common in the art and not particularly limited herein. Wireless links utilizing a signal over a carrier wave are well known and include Bluetooth and other wireless links carried over an ultrahigh frequency carrier wave as defined in legacy standard IEEE 802.15.1 and modernized equivalents thereof.

The present invention is compatible with Enterprise Device Licensing Agreement (EDLA) certification requirement which allows for 16 points of touch. EDLA is a collaboration between Google and Android developers to certify a device according to a set of standards. Achieving EDLA has become a standard in and of itself for the IFP industry allowing for the panels to have a complete review by a third party. EDLA certification of the invention allows older touchsource digital displays to be updated to a newer operating system, such as Android OS without prior vulnerabilities. Particularly preferred is at least an Android 10 version to Android 15 version.

A touchscreen display manufacturer may provide many proprietary applications and functions that require a specific match between hardware and software, so they design and manufacture their own OPS computers to maximize the functionality of their touchscreens. If a user were to upgrade with a generic OPS computer, the result may be reduced functionality or even complete system failure due to mismatched hardware and software. Unscrupulous users may even upgrade a touchscreen display with a faster but less compatible computer and then attempt to pass it off as a newer model for sale.

In some cases, therefore, the solution is to upgrade the computer using a proprietary adapter to install a new OPS computer. But, where the touchscreen is very old or simply has little to no functionality beyond the glass itself, simply upgrading the computer only provides part of the solution.

Touch points are the number of touch points a screen can recognize simultaneously. A single touch point, for example, would only allow for simple control such as tap, scroll or swipe using a single stylus or finger, for example. With more simultaneous touch points more complex actions can be used such as multiple-finger scrolling, multiple finger expand or zoom, and more complex actions involving multiple fingers, or stylus points, on the screen simultaneously. The number of touch points is not particularly limited herein with the understanding that advances in the number of touch points on a screen will likely continue to grow and therefore the instant invention allows compatibility with increased touch points which was previous difficult to provide.

Elements of the invention not otherwise specified are well known in the art and not necessarily limited herein including memory storage, touch screen technology, power systems and the like. A particular feature of the instant invention is the ability to interface and function with any system compatible with the generic operating system used such as Intel OPS.

The invention has been described with reference to the preferred embodiments without limit thereto. Those of skill in the art may realize additional improvements and embodiments which are not specifically stated but which are within the scope of the invention as set forth in the claims appended hereto.

The invention claimed is:

1. An interactive digital signage system comprising:
a pedestal comprising a base and a mast;
an interactive touchscreen digital display rotationally attached to said mast;
a controller for said interactive touchscreen digital display wherein said controller comprises a series 6000A+ computer;
at least one battery for providing power to said interactive digital signage system;
input/output ports capable of interfacing said controller to external devices; and
a collar between said interactive touchscreen digital display and said mast, wherein said collar comprises a cylinder which rotates in concert with said interactive touchscreen digital display and said cylinder provides electrical connectivity.

2. The interactive digital signage system of claim 1 wherein said mast has an adjustable length.

3. The interactive digital signage system of claim 2 wherein said mast is telescoping.

4. The interactive digital signage system of claim 2 wherein said mast comprises an upper mast and a lower mast wherein said upper mast and said lower mast are slidably engaged.

5. The interactive digital signage system of claim 1 wherein said controller comprises an Android operating system.

6. The interactive digital signage system of claim 5 wherein said Android operating system is an Android 10 to Android 15.

7. The interactive digital signage system of claim 1 wherein said controller is a NEXT Hub.

8. The interactive digital signage system of claim 1 wherein each input/output port of said input/output ports is independently selected from the group consisting of USB-A, USB-C, HDMI and VGA.

9. The interactive digital signage system of claim 1 further comprising at least one of a video camera; a microphone and a speaker.

10. The interactive digital signage system of claim 1 wherein said interactive touchscreen digital display pivots relative to said mask.

11. The interactive digital signage system of claim 1 wherein said at least one battery is in said base.

12. The interactive digital signage system of claim 1 wherein said at least one battery is a lithium ion battery.

13. The interactive digital signage system of claim 12 wherein said at least one battery is a lithium iron phosphate battery.

14. The interactive digital signage system of claim 1 wherein said controller is in said base.

15. The interactive digital signage system of claim 1 wherein at least one said input/output port of said input/output ports is in said interactive touchscreen digital display.

16. The interactive digital signage system of claim 1 wherein at least one said input/output port of said input/output ports is in said pedestal.

17. The interactive digital signage system of claim 1 further comprising at least one transponder integral to the interactive digital signage.

18. The interactive digital signage system of claim 17 wherein said transponder allows for connectivity of to at least one communication link.

19. The interactive digital signage system of claim 18 wherein said communication link is selected from the group consisting of WiFi, cellular signal and mobile data.

20. The interactive digital signage system of claim 1 further comprising at least one light integral to said interactive touchscreen digital display.

21. The interactive digital signage system of claim 20 wherein said at least one light is a light emitting diode.

22. The interactive digital signage system of claim 1 wherein said interactive touchscreen digital display comprises a screen.

23. The interactive digital signage system of claim 20 wherein said screen is an LCD flat panel.

24. The interactive digital signage system of claim 20 wherein said screen is a capacitive touchscreen with at least 5 up to 20 points of touch.

25. The interactive digital signage system of claim 20 further comprising a protective glass over said screen.

26. An interactive digital signage system of claim 5 comprising:
a pedestal comprising a base and a mast;
an interactive touchscreen digital display rotationally attached to said mast;
a controller for said interactive touchscreen digital display wherein said controller comprises a series 6000A+ computer;
at least one battery for providing power to said interactive digital signage system;
input/output ports capable of interfacing said controller to external devices; and
a collar between said interactive touchscreen digital display and said mast, wherein said collar comprises a cylinder which rotates in concert with said interactive touchscreen digital display and said cylinder provides electrical connectivity; and
traces on said drum cylinder and circumnavigating said drum cylinder.

27. The interactive digital signage system of claim 26 wherein said a collar comprises a brush rail comprising brushes wherein each brush of said brushes is in electrical contact with a trace of said traces.

28. The interactive digital signage system of claim 27 wherein said brush rail does not rotate in concert with said interactive touchscreen digital display.

29. The interactive digital signage system of claim 28 wherein said collar comprises a rotation indexer.

30. An interactive digital signage system comprising:
a pedestal comprising a base and a mast;
an interactive touchscreen digital display rotationally attached to said mast wherein said interactive touchscreen digital display comprises a capacitive touchscreen with at least 5 up to 20 points of touch;
a controller comprising an Android operating system;
at least one battery for providing power to said interactive digital signage system;
input/output ports capable of interfacing said controller to external devices; and
a collar between said interactive touchscreen digital display and said mast, wherein said collar comprises a cylinder which rotates in concert with said interactive touchscreen digital display and said cylinder provides electrical connectivity.

31. The interactive digital signage system of claim 30 wherein said mast has an adjustable length.

32. The interactive digital signage system of claim 31 wherein said mast is telescoping.

33. The interactive digital signage system of claim 31 wherein said mast comprises an upper mast and a lower mast wherein said upper mast and said lower mast are slidably engaged.

34. The interactive digital signage system of claim 30 wherein said Android operating system is an Android 10 to Android 15.

35. The interactive digital signage system of claim 30 wherein said controller is a NEXT Hub.

36. The interactive digital signage system of claim 30 wherein each input/output port of said input/output ports is independently selected from the group consisting of USB-A, USB-C, HDMI and VGA.

37. The interactive digital signage system of claim 30 further comprising at least one of a video camera, a microphone and a speaker.

38. The interactive digital signage system of claim 30 wherein said interactive touchscreen digital display pivots relative to said mast.

39. The interactive digital signage system of claim 30 wherein said at least one battery is in said base.

40. The interactive digital signage system of claim 30 wherein said at least one battery is a lithium ion battery.

41. The interactive digital signage system of claim 40 wherein said at least one battery is a lithium a lithium iron phosphate battery.

42. The interactive digital signage system of claim 30 wherein said controller is in said base.

43. The interactive digital signage system of claim 30 wherein at least one said input/output port of said input/output ports is in said interactive touchscreen digital display.

44. The interactive digital signage system of claim 30 wherein at least one said input/output port of said input/output ports is in said pedestal.

45. The interactive digital signage system of claim 30 further comprising at least one transponder integral to the interactive digital signage.

46. The interactive digital signage system of claim 45 wherein said transponder allows for connectivity to at least one communication link.

47. The interactive digital signage system of claim 46 wherein said communication link is selected from the group consisting of WiFi, cellular signal and mobile data.

48. The interactive digital signage system of claim 30 further comprising at least one light integral to said interactive touchscreen digital display.

49. The interactive digital signage system of claim 48 wherein said at least one light is a light emitting diode.

50. The interactive digital signage system of claim 30 wherein said interactive touchscreen digital display comprises a screen.

51. The interactive digital signage system of claim 50 wherein said screen is an LCD flat panel.

52. The interactive digital signage system of claim 50 further comprising a protective glass over said screen.

53. An interactive digital signage system comprising:
a pedestal comprising a base and a mast;
an interactive touchscreen digital display comprising a capacitive touchscreen with at least 5 up to 20 points of touch;
a controller comprising an Android operating system;
at least one battery for providing power to said interactive digital signage system;
input/output ports capable of interfacing said controller to external devices;
a collar between said interactive touchscreen digital display and said mast, wherein said collar comprises a cylinder which rotates in concert with said interactive touchscreen digital display and said cylinder provides electrical connectivity; and
traces on said cylinder and circumnavigating said cylinder.

54. The interactive digital signage system of claim 53 wherein said a collar comprises a brush rail comprising brushes wherein each brush of said brushes is in electrical contact with a trace of said traces.

55. The interactive digital signage system of claim 54 wherein said brush rail does not rotate in concert with said interactive touchscreen digital display.

56. The interactive digital signage system of claim 55 wherein said collar comprises a rotation indexer.

* * * * *